Jan. 5, 1932.         T. RITCHIE         1,839,595
STOCK WATERING DEVICE
Filed April 15, 1929
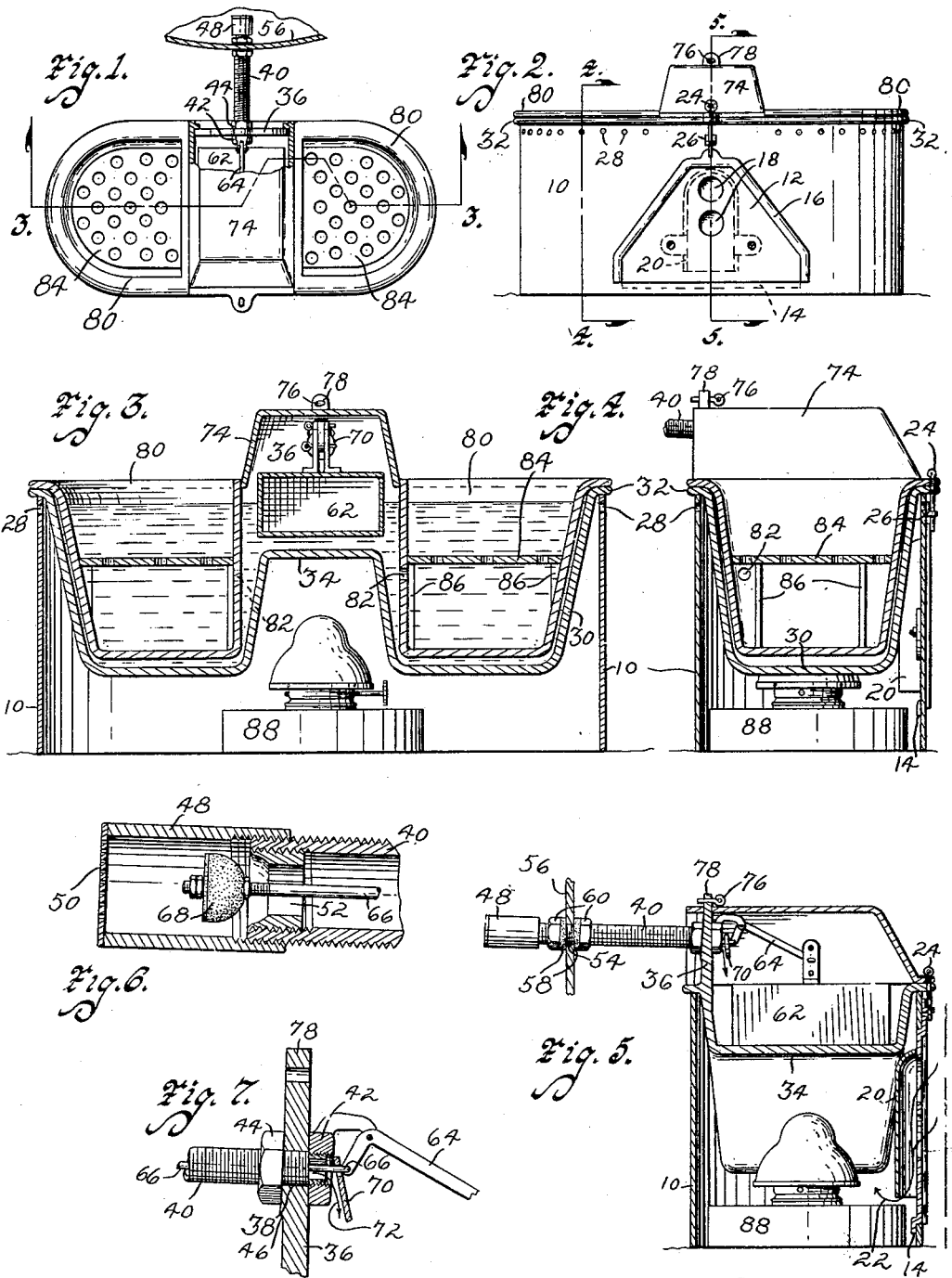
Inventor
Thomas Ritchie
by Bair, Freeman & Sinclair
Attorneys
Witness
Orval Floden Patented Jan. 5, 1932

1,839,595

UNITED STATES PATENT OFFICE

THOMAS RITCHIE, OF OSKALOOSA, IOWA, ASSIGNOR TO RITCHIE MANUFACTURING COMPANY, OF MARSHALLTOWN, IOWA, A CORPORATION OF IOWA

STOCK WATERING DEVICE

Application filed April 15, 1929. Serial No. 355,254.

The object of my invention is to provide a stock watering device of simple, durable and comparatively inexpensive construction.

A further object of my invention is to provide a stock watering device adapted for watering small stock, such as pigs, and adapted to be connected with a large watering tank, such as a tank for cattle and horses, whereby my stock watering device receives its supply of water from the large tank.

More particularly, it is my object to provide a waterer consisting of a tubelike casing having a trough suspended therein, a water pipe connection being provided from the trough to the large water tank and having a float valve arrangement for automatically regulating the supply of water from the large water tank to the smaller.

Still another object is to provide inside of the trough a pair of removable drinking cups each having a removable perforated plate whereby dirt and mud getting into the drinking cups (as the mud washed from the snouts of pigs when they are drinking) will settle beneath the perforated plates and the plates will effectively prevent the pigs from stirring the mud thus settled all through the water which they are drinking.

A further object in having the drinking cups removable is so that they may be cleaned out by turning them upside down, which of course, could not be done with a drinking trough permanently connected by means of a water pipe to a supply tank.

Still a further object is to provide the water trough portion of such construction that a shallow portion is provided in which the control float is arranged and deep portions for the drinking cups whereby the shallow portion provides a cavity below the drinking trough adapted to receive a heating lamp.

Still a further object is to provide a removable door having air inlet opening for air to enter the tubular casing for supplying the heating lamp with oxygen, a shield being provided to deflect such incoming air downwardly toward the bottom of the casing.

Still another object is to provide openings adjacent the top of the casing for the exit of the gases of combustion from the heating lamp.

Another object is to provide such exit openings adjacent only the deep portions of the watering trough so that it is impossible to blow the lamp out even when there is a high wind.

Still a further object is to provide a readily removable float cover adapted to be pinned in position by readily removable pins, one of which also retains the removable door in closed position.

A further object is to provide in connection with the float valve a deflector disk mounted on the float valve rod to prevent water from flowing onto the float and forming ice thereon in cold weather which would make the float undesirably heavy.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings forming a part of this specification and throughout the views of which like reference characters refer to the same parts.

Figure 1 is a plan view of my improved stock watering device showing it connected with a wall of a stock water tank, said wall and a portion of my stock waterer being shown in section.

Figure 2 is a front elevation of the stock waterer.

Figure 3 is an enlarged longitudinal sectional view on the line 3—3 of Figure 1.

Figures 4 and 5 are enlarged sectional views on the lines 4—4 and 5—5 of Figure 2; and Figures 6 and 7 are enlarged sectional views of portions of the float controlled valve and water pipe for supplying water from the large to the small waterer.

On the accompanying drawings I have used the reference numeral 10 to indicate a casing of tubular formation, open at its top and bottom ends. The casing 10 is provided with a door opening of suitably triangular shape in its front wall which is adapted to be closed by a removable door 12. The door 12 has a lip 14 along its lower edge adapted to coact with the bottom edge of the door opening in the casing 10. The door 12 has a flange 16 around its sides and top to coact with the outer surface of the casing 10, as best shown in Figure 5.

Formed in the door 12 are a pair of inlet openings 18 backed by a shield 20 for directing incoming air downwardly as indicated by the arrows 22 in Figure 5. The door 12 is held in position by a removable pin 24 extending through a perforated ear 26.

Surrounding the upper end of the casing 10 I provide a plurality of exit openings 28 which are equally spaced therearound with the exception of the middle portion of the front end back of the casing 10. The particular purpose of this arrangement of the openings 28 will be fully set forth in the specification following.

Removably suspended in the casing 10 is a watering trough 30. The trough 30 has a peripherial flange 32 resting on the top of the upper end of the casing 10. The trough 30 is provided with an upwardly recessed portion 34 at its center as clearly illustrated in Figure 3. On the back of the trough 30 an upwardly extending wall 36 is provided. The wall 36 has an opening 38 formed therethrough.

The opening 38 is adapted to receive a water pipe 40 which is held relative to the wall 36 by means of lock nuts 42 and 44. The lock nut 42 has the surface thereof which engages the wall 36 cut at a slant as clearly shown in Figure 7. The wall 36 has a slanted raised portion or boss 46 formed on its rear surface so that the pipe 40 when assembled relative to the wall 36 will slant upwardly and away therefrom. This occurs when the wall 36 is arranged in a vertical position or when the casing 10 is arranged level.

On the outer end of the pipe 40 a sleeve 48 is provided having a screen or perforated plate 50 on its end. In the end of the pipe a valve seat 52 is formed or screwed. The pipe 40 is adapted to extend through an opening 54 formed in the wall 56 of a large stock watering tank and is hydraulically connected therewith by means of washers 58 and lock nuts 60. The pipe 40 is threaded a considerable distance so that it may be extended through sheet metal tank walls 56 or thicker walls made of wood or concrete.

Within the trough 30 above the portion 34 thereof is a hollow float member 62. The float 62 is connected by means of a bell crank lever 64, with a valve rod 66 extending through the pipe 40 and terminating inside the sleeve 48. On the terminating end of the rod 66 is a valve plug 68 adapted for coacting with the valve seat 52. It is obvious that water flowing into the trough 30 will raise the float 62, closing the valve 68 when the water reaches a predetermined height.

To prevent the water flowing through the pipe 40 from flowing onto the float 62 and freezing thereon in cold weather, I provide a deflector disk 70 having an opening therein whereby the disk may be mounted on the valve rod 66. This disk causes the water to be directed downwardly as indicated by the arrow 72 instead of flowing onto the float 62.

I provide a cover member 74 for the float 62 and this cover member may be secured in position by the pin 24 and by another pin 76 removably positioned in an ear 78 formed on the wall 36. In each end of the watering trough 30 I provide removable drinking cups 80 which receive water from the trough 30 through openings 82 formed in end walls adjacent the portion 34 of the trough 30. Spaced from the bottom of the drinking cups 80 are perforated plates 84 supported on lugs 86 extending from the walls of the drinking cups 80.

Within the casing 10 and under the depressed portion 34 of the trough 30 I provide a heating lamp 88 which I find may be of small size for efficiently heating the water within the trough 30.

*Practical operation and advantages of my stock waterer*

In the operation of my device the water from the large stock tank enters through the screen 50 and flows past the valve 68 and into the trough 30, as indicated by the arrows 72 in Figure 7. When the water rises to a predetermined point, the float 62 closes the valve 68. The normal level of the water is approximately as indicated in Figure 3. The pigs may now drink from the cups 80 above the plates 84 and any mud being washed from their snouts will settle through the perforations of the plates 84 and to the bottom of the cups 80. The plates 84 prevent the pigs from extending their snouts into the mud and stirring it up. When it is desirable to remove this settled mud the cups 80 may be easily removed and turned upside down.

The pipe 40 is arranged slanting so that any water therein after the valve 68 closes will drain into the trough 30. The float 62 is protected against damage by the cover 74 which may be easily removed for gaining access to the float for repairs, replacements or adjustments. The incoming air indicated at 22 is deflected toward the bottom of the casing 10 so that it can enter the burner of the heater lamp 88. The foul gases and heat from the burner 88 flow into the depression 34 and then around the sides of the trough 30 for delivering the heat to the entire wall surface of the trough 30. The foul gases then are discharged through the exit openings 28 which surround the casing 10 with the exception of the points adjacent the depression 34. This evenly distributes the heat to the trough 30 and prevents a direct draft from the burner of the heating lamp 88 to outside atmosphere which would be the case if the openings 28 were also provided adjacent the depression 34. I have found that even in a high wind the lamp does not become extinguished, since the arrangement of my device has eliminated all likelihood of such drafts as would extinguish the flame of the burner.

Another advantage of my construction lies in forming the upwardly depressed portion 34 so that it is higher than any sediment settling in the water trough and therefore, no sediment can get under the float 62 to affect its operation. The opening 82 and drinking cups 80 being positioned above the bottom of the drinking cups also aid in this respect, since they do not allow the sediment to get into the drinking trough 30 except when the device is neglected and too much sediment is left in it before cleaning it out.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a device of the character disclosed, a watering trough, an upstanding wall thereon having a slanting surface, a water supply pipe connected with said wall at right angles to such surface, a valve in said pipe, a float in said trough operatively connected with said valve and a cover member for said float having an open end spanned by said wall.

2. In a stock watering device, a tubular casing, a trough suspended therein having an upwardly recessed portion in the bottom thereof, the space above said portion constituting a float compartment, a float arranged in such float compartment, a cover for said float compartment only and a drinking cup suspended in said trough and spanning the remaining upper end of the trough left by said cover.

3. In a device of the character disclosed, a watering trough, an upstanding wall thereon, a water supply pipe connected with said wall, a valve in said pipe, a float in said trough operatively connected with said valve and a cover for said float compartment having an open end closed by said upstanding wall.

4. In a device of the character disclosed, a watering trough, an upstanding wall thereon, a water supply pipe connected with said wall, a valve in said pipe and a float in said trough operatively connected with said valve, said valve including a horizontal stem extending through said pipe and a deflector disk suspended on and supported by said stem.

5. In combination with a watering trough and a supply pipe having a valve stem extending therethrough, means for deflecting water downwardly as it leaves said pipe comprising a deflector disk, an opening therein through which said stem extends whereby the disk is supported by the stem.

6. In a stock watering trough, a casing, a trough suspended therein having walls spaced from the walls of the casing and having an upwardly recessed, transversely arranged compartment in the bottom thereof, a heater in said compartment, said compartment having open ends at the sides of said trough and communicating with the space between the walls of the trough of the casing, said casing having exit openings extending therearound except adjacent said open ends of said recessed portion and a heating lamp below said portion.

Des Moines, Iowa, March 11, 1929.

THOMAS RITCHIE.